(12) United States Patent
Chen et al.

(10) Patent No.: US 11,577,387 B2
(45) Date of Patent: Feb. 14, 2023

(54) METHOD AND SYSTEM FOR DETECTING AND PICKING UP OBJECTS

(71) Applicant: SOLOMON TECHNOLOGY CORPORATION, Taipei (TW)

(72) Inventors: Cheng-Lung Chen, Taipei (TW); Tsung-Cheng Lai, Taipei (TW); Yu-Yen Liu, Taipei (TW); Xuan Loc Nguyen, Taipei (TW)

(73) Assignee: SOLOMON TECHNOLOGY CORPORATION, Taipei (TW)

( * ) Notice: Subject to any disclaimer, the term of this patent is extended or adjusted under 35 U.S.C. 154(b) by 246 days.

(21) Appl. No.: 17/071,594

(22) Filed: Oct. 15, 2020

(65) Prior Publication Data

US 2021/0114208 A1 Apr. 22, 2021

(30) Foreign Application Priority Data

Oct. 18, 2019 (TW) ................. 108137744

(51) Int. Cl.
*G05B 19/04* (2006.01)
*B25J 9/16* (2006.01)
(Continued)

(52) U.S. Cl.
CPC ............. *B25J 9/1612* (2013.01); *B25J 9/161* (2013.01); *B25J 9/1697* (2013.01); *B25J 13/08* (2013.01);
(Continued)

(58) Field of Classification Search
CPC ........ B25J 9/1612; B25J 9/161; B25J 9/1697; B25J 13/08; B25J 15/0061; B25J 15/0616;
(Continued)

(56) References Cited

U.S. PATENT DOCUMENTS 8,491,026 B1 * 7/2013 McGill .................... B25J 15/04
294/81.51
10,913,165 B1 * 2/2021 Jonas .................. B25J 15/0052
(Continued)

FOREIGN PATENT DOCUMENTS

| CN | 106865215 A | 6/2017 |
|---|---|---|
| CN | 107512581 A | 12/2017 |
| KR | 101472266 B1 | 12/2014 |

OTHER PUBLICATIONS

Search Report appended to an Office Action, which was issued to Taiwanese counterpart application No. 108137744 by the TIPO dated Nov. 13, 2019, with an English translation thereof—2 pages.

*Primary Examiner* — Harry Y Oh
(74) *Attorney, Agent, or Firm* — Hamre, Schumann, Mueller & Larson, P.C.

(57) ABSTRACT

A method includes steps of: capturing an image of a container; recognizing at least one object in the container based on the image; determining at least one first coordinate set corresponding to the at least one object; determining at least one second coordinate set that corresponds to target one (s) of the at least one first coordinate set and that relates to a fixed picking device of a robotic arm; adjusting position(s) of unfixed picking device(s) of the robotic arm if necessary; controlling the robotic arm to pick up one (s) of the at least one object that correspond(s) to the at least one second coordinate set with the fixed picking device and/or at least one unfixed picking device.

12 Claims, 9 Drawing Sheets

(51) Int. Cl.
*B25J 15/00* (2006.01)
*B25J 15/06* (2006.01)
*G06T 7/70* (2017.01)
*G06T 7/60* (2017.01)
*B25J 13/08* (2006.01)

(52) U.S. Cl.
CPC ....... *B25J 15/0061* (2013.01); *B25J 15/0616* (2013.01); *G06T 7/60* (2013.01); *G06T 7/70* (2017.01); *G06T 2207/10012* (2013.01); *G06T 2207/10024* (2013.01); *G06T 2207/20081* (2013.01); *G06T 2207/20084* (2013.01)

(58) Field of Classification Search
CPC ... G06T 7/60; G06T 7/70; G06T 2207/10012; G06T 2207/10024; G06T 2207/20081; G06T 2207/20084; G06T 7/66; G06T 7/73; G06T 2207/10028; G06T 2207/20021; G06T 2207/30128; G05B 2219/39543; G05B 2219/40607; G05B 2219/45063
See application file for complete search history.

(56) References Cited

U.S. PATENT DOCUMENTS

| | | | |
|---|---|---|---|
| 2006/0182604 A1 | 8/2006 | Clark et al. | |
| 2020/0214185 A1* | 7/2020 | Awada | H05K 13/0409 |
| 2021/0114208 A1* | 4/2021 | Chen | B25J 9/1612 |
| 2021/0337734 A1* | 11/2021 | Jeanty | B65G 47/914 |

\* cited by examiner

METHOD AND SYSTEM FOR DETECTING AND PICKING UP OBJECTS

CROSS-REFERENCE TO RELATED APPLICATION

This application claims priority of Taiwanese Invention Patent Application No 108137744 filed on Oct. 18, 2019.

FIELD

The disclosure relates to object pick-up, and more particularly to a method and a system for detecting and picking up objects.

BACKGROUND

A robotic arm is an automatic control equipment that can imitate functions of a human arm to perform tasks such as soldering, assembling, packing, object-moving, etc., and is extensively used in various workplaces to save human resources and to protect workers from dangerous activities. A conventional robotic arm for object-moving can operate on only one object (e.g., picking up one object at a first location and then putting the object down at a second location) at a time. When there are, for example, ten objects of a same kind to be moved from a first location to a second location, the conventional robotic arm needs to make ten round trips between the first and second locations to complete the task, consuming a large amount of time.

SUMMARY

Therefore, an object of the disclosure is to provide a method and a system for detecting and picking up objects that can alleviate at least one of the drawbacks of the prior art. In particular, the provided method and a system may pick up multiple objects simultaneously and then drop the multiple objects at a designated location simultaneously, and may therefore save time.

According to one aspect of the disclosure, a method for detecting and picking up objects is to be performed by a system including a robotic arm, a controller and an image recognition device. The robotic arm includes N+1 number of picking devices that are arranged in a predefined pattern and on a picking jig, and that include a fixed picking device and N number of unfixed picking devices, wherein N is a positive integer, and a distance between each of the unfixed picking devices and the fixed picking device is adjustable. The method comprises the following steps that are performed by the image recognition device: capturing an image of a container; recognizing at least one object in the container based on the image thus captured by means of an image recognition technique; determining at least one center point respectively for the at least one object thus recognized; determining at least one first coordinate set respectively of the at least one center point, each of the at least one first coordinate set representing a relative position of the respective one of the at least one center point to the image recognition device; and sending the at least one first coordinate set to the controller. The method further comprises the following steps that are performed by the controller when the at least one object recognized in the container includes multiple objects and when the at least one first coordinate set determined and sent by the image recognition device includes multiple first coordinate sets respectively of multiple center points which are determined respectively for the multiple objects: selecting M number of target first coordinate sets from among the multiple first coordinate sets, M being a positive integer that ranges from two to N+1, the M number of target first coordinate sets respectively corresponding to M number of objects among the multiple objects, arrangement of the N number of objects matching the predefined pattern, and a largest distance between any two of the M number of objects not exceeding a predetermined distance; determining N number of second coordinate sets based respectively on the M number of target first coordinate sets, the M number of second coordinate sets each representing a relative position of the center point of one of the objects that corresponds to the respective one of the target first coordinate sets to the fixed picking device; determining a target orientation of the picking jig based on the M number of second coordinate sets; selecting one of the M number of second coordinate sets as a target second coordinate set; adjusting positions of M−1 number of unfixed picking devices which are among the N number of unfixed picking devices based on the target second coordinate set and M−1 number of second coordinate sets which are the M number of second coordinate sets other than the target second coordinate set, in order to adjust distances each between a respective one of the M−1 number of unfixed picking devices and the fixed picking device; controlling the robotic arm to horizontally rotate the picking jig based on the target orientation, and move the picking jig based on the target second coordinate set, such that the fixed picking device is aligned with the center point of one of the objects that corresponds to the target second coordinate set, and that the M−1 number of unfixed picking device are aligned respectively with M−1 center points respectively of M−1 number of objects that respectively correspond to the M−1 number of second coordinate sets; and controlling the robotic arm to simultaneously pick up the M number of objects with the M−1 number of unfixed picking devices and the fixed picking device, and then drop the M number of objects at a designated location.

According to one aspect of the disclosure, a system for detecting and picking up objects comprises a robotic arm, a controller electrically connected to the robotic arm, and an image recognition device in communication with the controller. The robotic arm includes a picking jig disposed at an end portion of the robotic arm, and N+1 number of picking a devices disposed on the picking jig. The picking devices are arranged in a predefined pattern, and include a fixed picking device and N number of unfixed picking devices, wherein a distance between each of the unfixed picking devices and the fixed picking device is adjustable, and N is a positive integer. The image recognition device is configured to capture an image of a container. The image recognition device is configured to recognize at least one object in the container based on the image by means of an image recognition technique. The image recognition device is configured to determine at least one center point respectively for the at least one object. The image recognition device is configured to determine at least one first coordinate set respectively of the at least one center point, wherein each of the at least one first coordinate set represents a relative position of the respective one of the at least one center point to the image recognition device. The image recognition device is configured to send the at least one first coordinate set to the controller. The controller is configured to, when the at least one object recognized in the container includes multiple objects and when the at least one first coordinate set determined and sent by the image recognition device includes multiple first coordinate sets respectively of multiple center points which are determined respectively for the multiple objects, select M number of target first coordinate sets from the multiple first coordinate sets received from the image recognition device, wherein M is a positive integer that ranges from two to N+1, the M number of target first coordinate sets respectively correspond to M number of objects among the multiple objects, arrangement of the M number of objects matches the predefined pattern, and a largest distance between any two of the M number of objects does not exceed a predetermined distance. The controller is configured to determine M number of second coordinate sets based respectively on the M number of target first coordinate sets, wherein the M number of second coordinate sets each represent a relative position of the center point of one of the objects that corresponds to the respective one of the target first coordinate sets to the fixed picking device. The controller is configured to determine a target orientation of the picking jig based on the M number of second coordinate sets. The controller configured to select one of the M number of second coordinate sets as a target second coordinate set. The controller is configured to adjust positions of M−1 number of unfixed picking devices which are among the N number of unfixed picking devices based on the target second coordinate set and M−1 number f second coordinate sets which are the M number of second coordinate sets other than the target second coordinate set, in order to adjust distances each between respective one of the M−1 number of unfixed picking devices and the fixed picking device. The controller is configured to control the robotic arm to horizontally rotate the picking jig based on the target orientation, and move the picking jig based on the target second coordinate set, such that the fixed picking device is aligned with the center point of one of the objects that corresponds to the target second coordinate set, and that the M−1 number of unfixed picking device are aligned respectively with M−1 center points respectively of number of objects that respectively correspond to the M−1 number of second coordinate sets. The controller is configured to control the robotic arm to simultaneously pick up the N number of objects with the M−1 number of unfixed picking devices and the fixed picking device, and then drop the M number of objects at a designated location.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
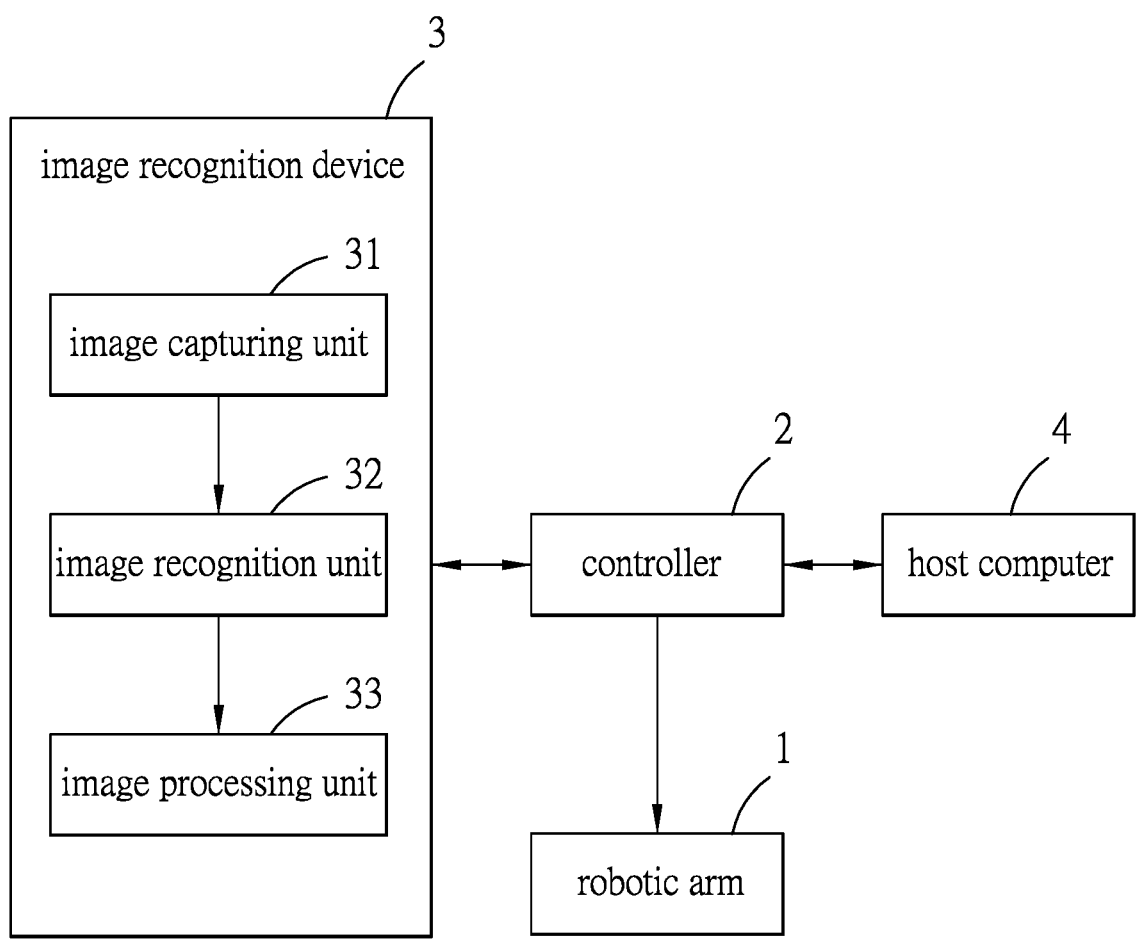
FIG. 1 is a block diagram exemplarily illustrating a system for detecting and picking up objects according to one embodiment of the disclosure.

Before the disclosure is described in Greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates a system for detecting and picking up objects according to an embodiment of the disclosure. The system includes a robotic arm 1, a controller 2, an image recognition device 3 and a host computer 4. The controller 2 is electrically connected to the robotic arm 1 and the host computer 4 in order to receive picking instructions from the host computer 4 and to control the robotic arm to perform tasks based on the received picking instructions. The image recognition device 3 is in communication with the controller 2 through a wired- or wireless communication technique (e.g., network communication), and is also controlled by the controller 2.

Figure 2:
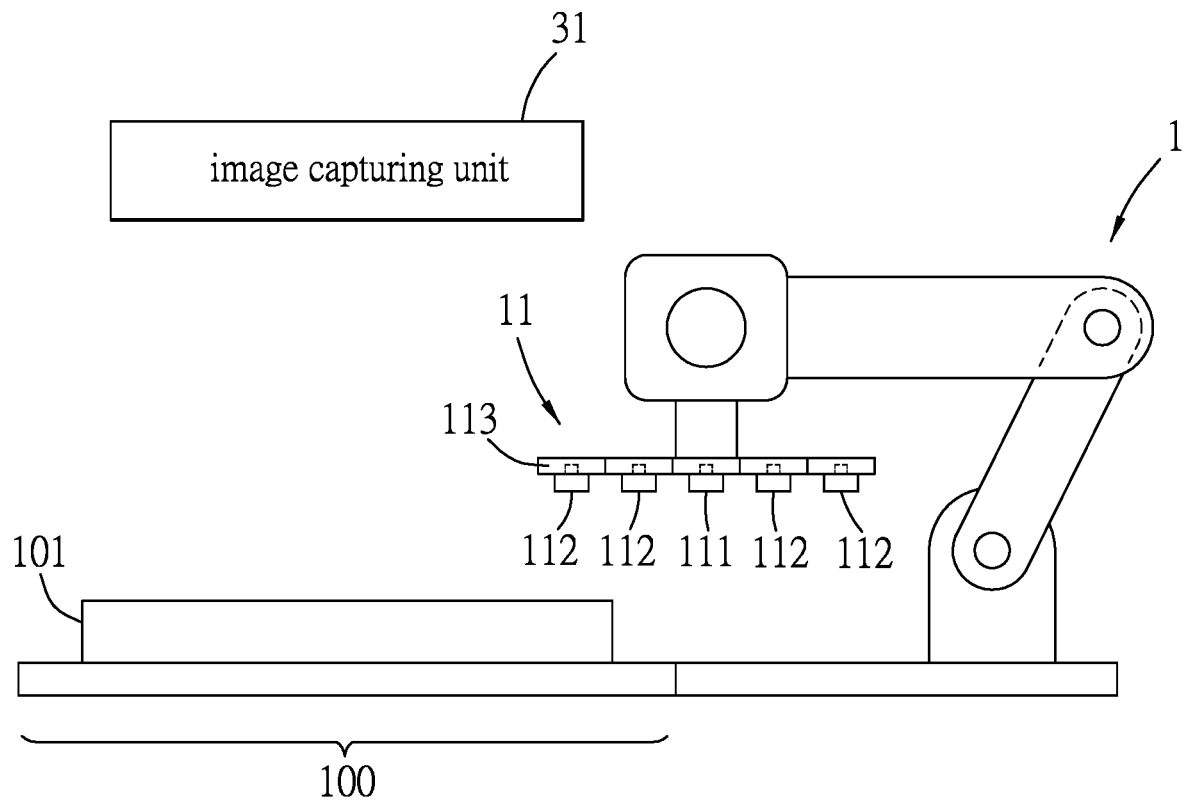
FIG. 2 is a schematic diagram exemplarily illustrating relative positions of a robotic arm, an image capturing unit and a picking area according to one embodiment of the disclosure.

Referring to FIG. 2, according to an embodiment of the disclosure, the robotic arm is disposed adjacent to a picking area 100 where a container 101 that contains object (s) to be picked up and moved by the system may be disposed. The robotic arm 1 includes a picking jig 11 that is horizontally rotatable, and that is disposed at an end portion of the robotic arm 1, with multiple picking devices disposed on the picking jig 11. Orientation of the picking jig 11 is controlled by the controller 2. According to an embodiment, the multiple picking devices are N+1 number of picking devices including a fixed picking device 111 and N number of unfixed picking devices 112, wherein N is a positive integer. The N number of unfixed picking devices 112 are positioned on an extendable mechanism 113 that is mounted on the picking jig 11 and that may drive the unfixed picking devices 112 individually to change positions of the individual unfixed picking devices 112 on the picking jig 11, such that a distance between each of the unfixed picking devices 112 and the fixed picking device 111 is adjustable. In an embodiment of the disclosure, the extendable mechanism 113 includes at least one extendable rail (not shown), each of which can be driven, by a driving circuit (not shown) of the extendable mechanism 113 and according to a control signal from the controller 2, to bring an individual unfixed picking device 112 positioned on the extendable rail to move along an extension direction of the extendable rail, in order to shorten or lengthen the distance between the individual unfixed picking device 112 and the fixed picking device 111. According to some embodiments, the picking devices may each be a sucking disk or a gripper, but the disclosure is not limited thereto.

The picking devices of the robotic arm 1 are arranged in a predefined pattern. According to some embodiments of the disclosure, the picking devices may be arranged in a straight line. For example, FIG. 3 exemplarily illustrates five picking devices including four unfixed picking devices 112 and one fixed picking device 111 that are arranged in a straight line, wherein the four unfixed picking devices 112 are evenly distributed at two sides of the fixed picking device 111. However, the disclosure is not limited to the straight-line pattern. According to some embodiments of the disclosure, the picking devices may also be arranged in an X×Y array, wherein X and Y are integers greater than 1. For example, the picking devices may include four picking devices that are arranged in a 2×2 array, six picking devices in a 2×3 array, or nine picking devices in a 3×3 array.

Referring back to FIG. 1, according to an embodiment of the disclosure, the image recognition device 3 includes an image capturing unit 31, an image recognition unit 32 electrically connected to the image capturing unit 31, and an image processing unit 33 electrically connected to the image recognition unit 32. At least the image capturing unit 31 of the image recognition device 3 (if not the entire image recognition device 3) is disposed above the picking area 100, as shown in FIG. 2, in order for the image recognition device 3 to capture an image of the container 101 that is placed in the picking area 100. According to some embodiments of the disclosure, the image capturing unit 31 may be implemented by a camera. For example, in an embodiment of the disclosure, the image capturing unit 31 is a three-dimensional camera that is configured to capture a three-dimensional color image of the container 101. According to some embodiments of the disclosure, the image processing unit 33 may include a processor, and the image recognition unit 32 may be implemented by at least one circuit that is installed with an artificial neural network (ANN) which has been trained in advance and that executes the ANN to recognize existence of any object in the container and a quantity of the object (s) (if any) when the image captured by the image capturing unit 31 is inputted to the ANN. In one embodiment, the recognition is made without categorizing the object (e.g., naming the object). The ANN may be established and trained by using any appropriate deep learning technique. In training the ANN, a large number of image samples (including three-dimensional color images) that contain various objects having various sizes, contours, shapes, colors and patterns may be used to construct and improve a deep learning algorithm of the ANN, such that the trained ANN can recognize existence of any object in a container presented in an image which is inputted to the ANN by determining an outline of each of the object (s) (if any) in the container, count the number of the object (s) based on the outline (s) thus determined, and generate an analyzed image in which each recognized object is represented by its outline. Since establishing and training the ANN relates to known technique and is not pertinent to the preset disclosure, details thereof are not described herein.

Figure 4:
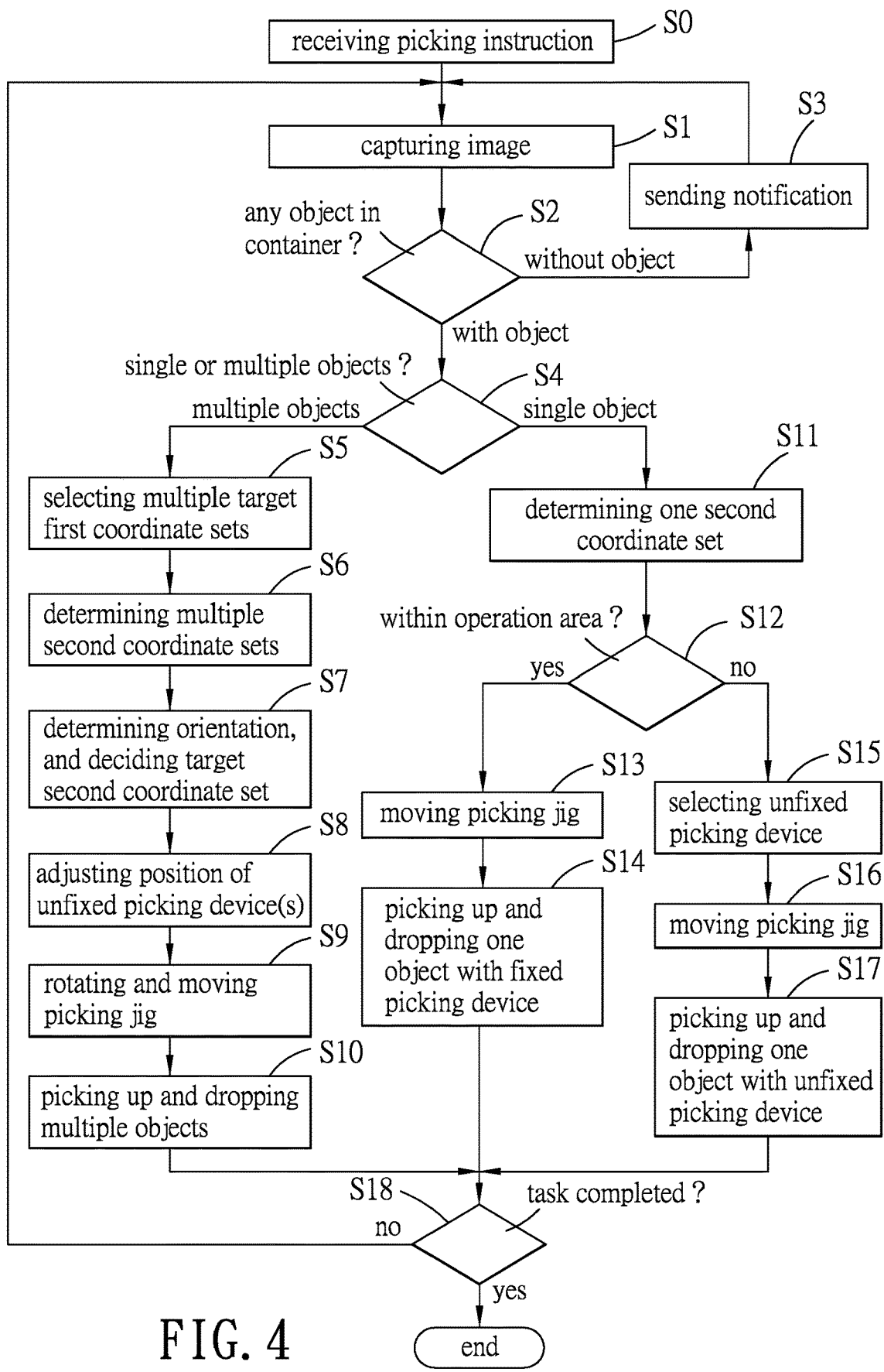
FIG. 4 is a flow chart of a method for detecting and picking up objects according to an embodiment of the disclosure.

FIG. 4 exemplarily illustrates a method for detecting and picking up objects that may be performed by the system of FIG. 1 according to one embodiment of the disclosure. The method starts at Step S0, where the controller 2 receives a picking instruction from the host computer 4. The received picking instruction contains information of a pick-and-drop task, including a number of objects to be picked up. The picking instruction may also indicate one or more designated locations where the picked up objects are to be dropped. For example, a picking instruction received by the controller 2 may indicate "picking up eight objects, dropping three objects at a first location, dropping three objects at a second location, and dropping two objects at a third location", under the situation that three containers have been placed at the first, second and third locations, respectively, and that the host computer has controlled a conveyor (e.g., a conveyor belt; not shown) to convey a container 101 to the picking area 100. The container 101 is open such that the image capturing unit 31 of the image recognition device 3 may clearly capture an image of the interior of the container 101 beneath the image capturing unit 31, and that any object in the container 101 may readily be picked up by the robotic arm 1.

In Step S1, the controller 2 instructs the image capturing unit 31 of the image recognition device 3 to capture an image (e.g., a three-dimensional color image) (also referred to as "captured image" hereinafter) of the container 101, and to send the captured image to the image recognition unit 32.

Figure 5:
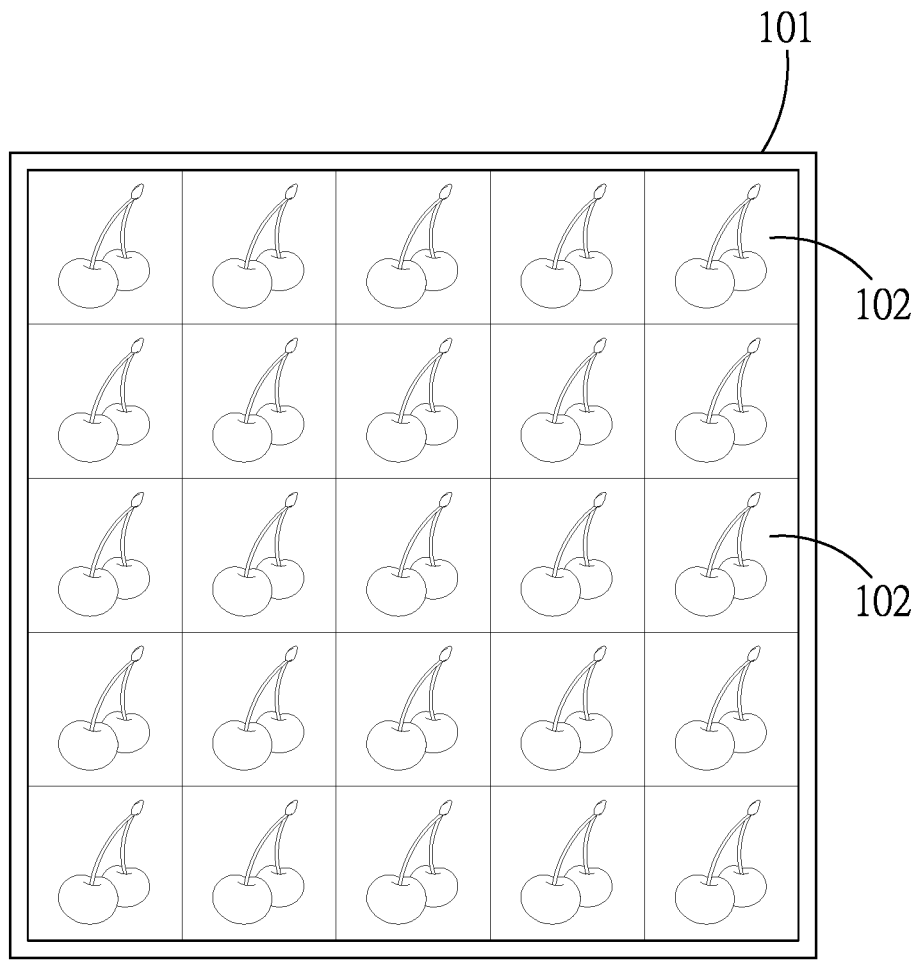
FIG. 5 is a schematic diagram exemplarily illustrating a container that is fully occupied and contains neatly arranged objects.
Figure 6:
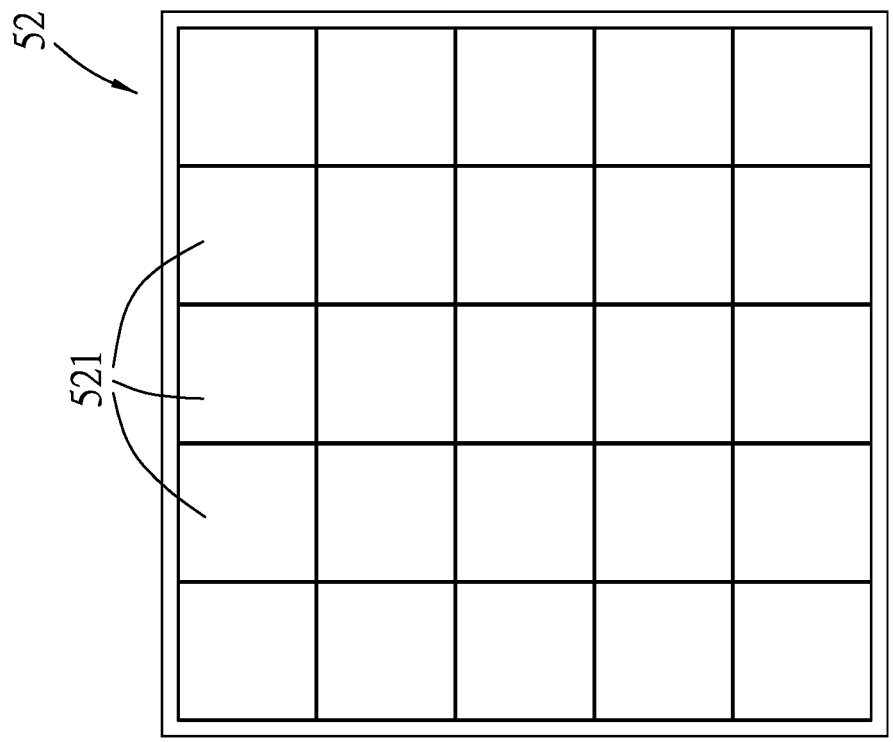
FIG. 6 is a schematic diagram exemplarily illustrating a captured image and an analyzed image of the container of FIG. 5.
Figure 6:
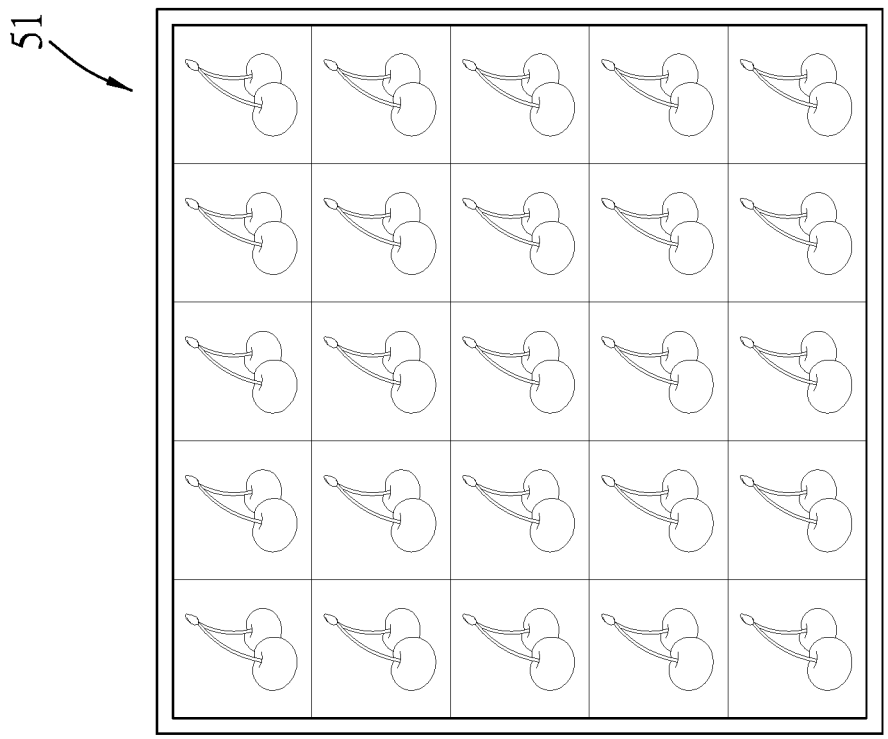

In Step S2, the image recognition unit 32 of the image recognition device 3 analyzes the image received from the image capturing unit 31 to determine whether there is at least one recognized object in the container 101 by recognizing any object in the container 101 through an image recognition technique (e.g., the trained ANN that has been described above). The image recognition unit 32 further generates, from the received image, an analyzed image that outlines each object that has been recognized. For example, if the container 101 is fully occupied, and contains twenty-five rectangular objects 102 (e.g., cherry boxes) that are neatly and tightly arranged as a 5×5 array as illustrated in FIG. 5, the image capturing unit 31 may capture, in Step S1, an image 51 of the container 101 as shown in FIG. 6, and then the image recognition unit 32 may generate, in Step S2, an analyzed image 52 as shown in FIG. 6 that includes twenty-five squares 521 representing the outlines of the twenty-five rectangular objects 102, respectively.

When no object is recognized by the image recognition unit 32 in Step S2, the procedure goes to Step S3; when at least one object is recognized by the image recognition unit 32 in Step S2, the procedure goes to Step S4.

In Step S3, the image recognition device 3 sends a notification that indicates an empty container to the controller 2. Upon receiving the notification from the image recognition device 3, the controller 2 sends a signal to the host computer 4 in order for the host computer 4 to control the conveyor to withdraw the container 101 currently at the picking area 100 from the picking area 100, and convey another container 101 to the picking area 100. Then, the procedure goes back to Step S1.

Figure 7:
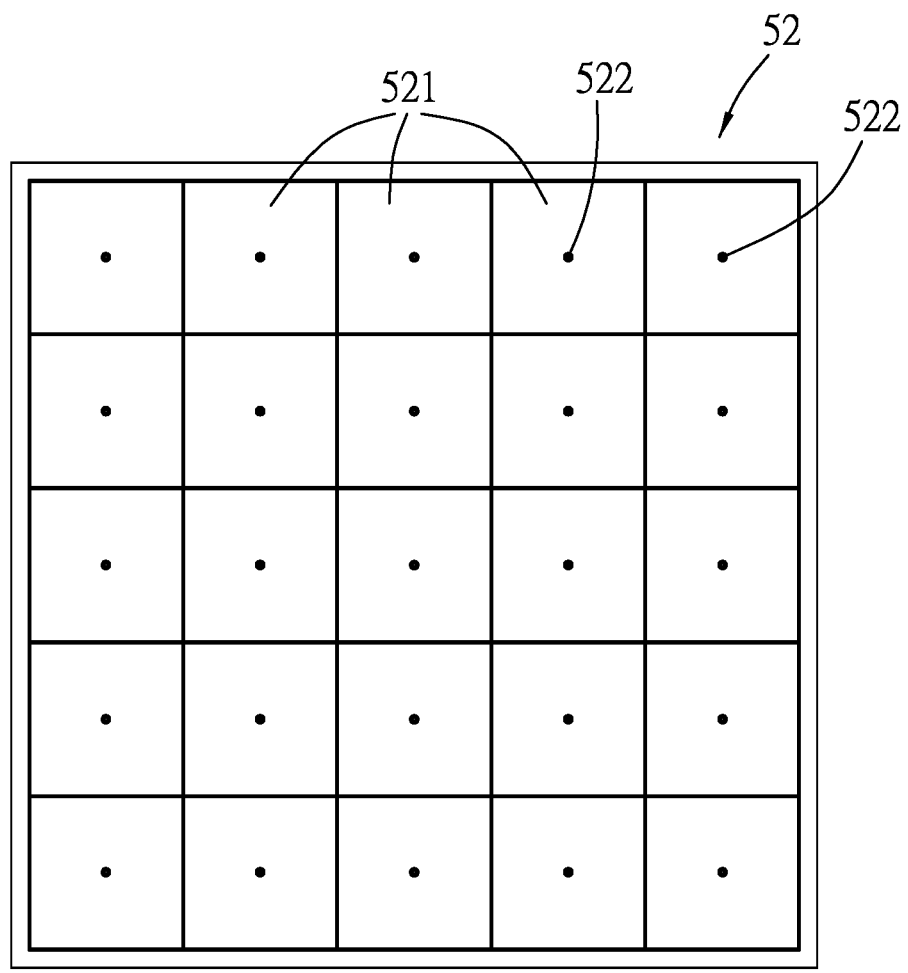
FIG. 7 is a schematic diagram exemplarily illustrating center points of objects.

In Step S4, the image recognition unit 32 sends the analyzed image to the image processing unit 33, and the image processing unit 33, upon receiving the analyzed image from the image recognition unit 32, determines at least one center point (e.g., geometric center) respectively for the at least one object based on the at least one outline respectively of the at least one object that is included in the analyzed image. Then, the image processing unit 33 determines at least one first coordinate set respectively of the at least one center point, and sends the at least one first coordinate set to the controller 2, wherein each of the at least one first coordinate set represents a relative position of the respective one of the at least one center point to the image recognition device 3, especially the image capturing unit 31. For example, continuing with the example of FIGS. 5 and 6 and referring to FIG. 7, upon receiving the analyzed image 52 from the image recognition unit 32 that includes the twenty-five squares 521 representing the outlines of the twenty-five objects 102 of FIG. 5, the image processing unit 33 may determine twenty-five center points 522 respectively for the twenty-five objects 102, with each center points 522 being a geometric center of one of the squares 521 that outlines the respective object 102. Ideally, the objects 102 in the container 101 are arranged such that a distance between the center points 522 of two adjacent objects 102 is less than a maximum of an adjustable distance between the fixed picking device 111 on the picking jig 11 and an unfixed picking device 112 on the picking jig 11 that is immediately adjacent to the fixed picking device 111, and, when there are two or more unfixed picking devices 112 arranged at a same side of the fixed picking device 111 on the picking jig 11, also less than a maximum of an adjustable distance between two adjacent unfixed picking device 112 at a same side of the fixed picking device 111 on the picking jig 11.

In an embodiment of the disclosure, the image that the image capturing unit 31 captured in Step S1 covers the whole picking area 100, and each time the container 101 is conveyed to be placed at the picking area 100, a position of the container 101 relative to the image capturing unit 31 is fixed and is determined in advance. Therefore, in this embodiment, the image processing unit 33 may use the position of the container 101 relative to the image capturing unit 31 and positions of the center points in the analyzed image to determine the first coordinate sets in Step S4.

Moreover, the image processing unit 33 further determines whether multiple objects or only one object was recognized by the image recognition unit 32 in Step S2. When multiple objects were recognized by the image recognition unit 32 in Step S2, multiple center points would be determined by the image processing unit 33 in this step, so the image processing unit 33 is able to determine that multiple objects were recognized by the image recognition unit 32 in step S2, and in this case the procedure goes to Step S5. On the other hand, when only one center point is determined by the image processing unit 33 in this step, it means that only one object was recognized by the image recognition unit 32 in Step S2, and in this case the procedure goes to Step S11.

In Step S5, the controller 2 receives the multiple first coordinate sets from the image recognition device 3, and selects M number of target first coordinate sets from among the multiple first coordinate sets, wherein M is a positive integer ranging from two to N+1 and may be determined based on the picking instruction received from the host computer 4. The M number of target first coordinate sets respectively correspond to M number of objects among the multiple objects, and are selected such that distribution of the M number of objects matches the predefined pattern of arrangement of the picking devices, and that a largest distance between any two of the M number of objects does not exceed a predetermined distance that is a maximum distance of any two of the picking devices when each of the N number of unfixed picking devices 112 is moved to its farthest position from the fixed picking device 111. In an embodiment of the disclosure where the predefined pattern of arrangement of the picking devices is a straight line, the M number of target first coordinate sets are further selected such that the M number of target first coordinate sets include one first coordinate set that corresponds to an object which is among the multiple objects and which is located closest to a corner (e.g., the upper-deft corner) of the container, and M-1 number of target first coordinate sets that are nearest to the one first coordinate set in a straight line passing through the one first coordinate set. In another embodiment of the disclosure where the predefined pattern of arrangement of the picking devices is also a straight line and the objects are arranged neatly in rows and columns in the container 101, the M number of target first coordinate sets are further selected such that the M number of target first coordinate sets include one first coordinate set that corresponds to an object that is among the multiple objects and that is a leftmost object in an upmost row of the multiple objects, and M-1 number of target first coordinate sets that correspond to M-1 number of objects which are among the multiple objects and which are also in the row.

In Step S6, the controller 2 determines M number of second coordinate sets based respectively on the M number of target first coordinate sets. The M number of second coordinate sets each represent a relative position of the center point of the object that corresponds to the respective target first coordinate set to the fixed picking device 111 which is at a default (standby) location. According to an embodiment of the disclosure, a relative position of the fixed picking device 111 at the default location to the image capturing unit 31 is fixed and has been predetermined, so that the controller 2 may easily convert the M number of target first coordinate sets to the M number of second coordinate sets based on the relative position of the fixed picking device 111 to the image capturing unit 31.

In Step S7, the controller 2 determines a target orientation of the picking jig 11 based on the M number of second coordinate sets, and selects one of the M number of second coordinate sets as a target second coordinate set. In an embodiment of the disclosure, a middle one of the M number of second coordinate sets is selected as the target second coordinate set, but the disclosure is not limited thereto.

In Step S8, the controller 2 adjusts positions of M-1 number of unfixed picking devices 112 among the N number of unfixed picking devices 112 based on the target second coordinate set and M-1 number of second coordinate sets which are the M number of second coordinate sets other than the target second coordinate set (i.e., overall, based on the M number of second coordinate sets), in order to adjust distances each between a respective one of the M-1 number of unfixed picking devices 112 and the fixed picking device 111 to be substantially equal to a distance between the target second coordinate set and a respective one of the M-1 number of second coordinate sets (e.g., to be substantially equal to a distance between a center point of an object that corresponds to the target second coordinate set and a center point of an object that corresponds to the respective one of the M-1 number of second coordinate sets).

In Step S9, the controller 2 controls the robotic arm 1 to horizontally rotate the picking jig 11 based on the target orientation and move the picking jig 11 based on the target second coordinate set, such that the fixed picking device 111 is aligned with the center point of the object that corresponds to the target second coordinate set, and that the M-1 number of unfixed picking devices 112 are aligned respectively with M-1 center points respectively of M-1 number of objects that respectively correspond to the M-1 number of second coordinate sets.

In Step S10, the controller 2 controls the robotic arm 1 to simultaneously pick up the M number of objects with the M-1 number of unfixed picking devices 112 and the fixed picking device 111, and then drop the M number of objects at one or more designated location(s) indicated in the picking instruction received in Step S0.

Figure 3:
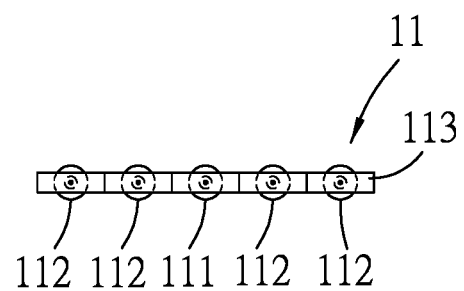
FIG. 3 is a schematic diagram exemplarily illustrating a predefined pattern of arrangement of picking devices according to one embodiment of the disclosure.
Figure 8:
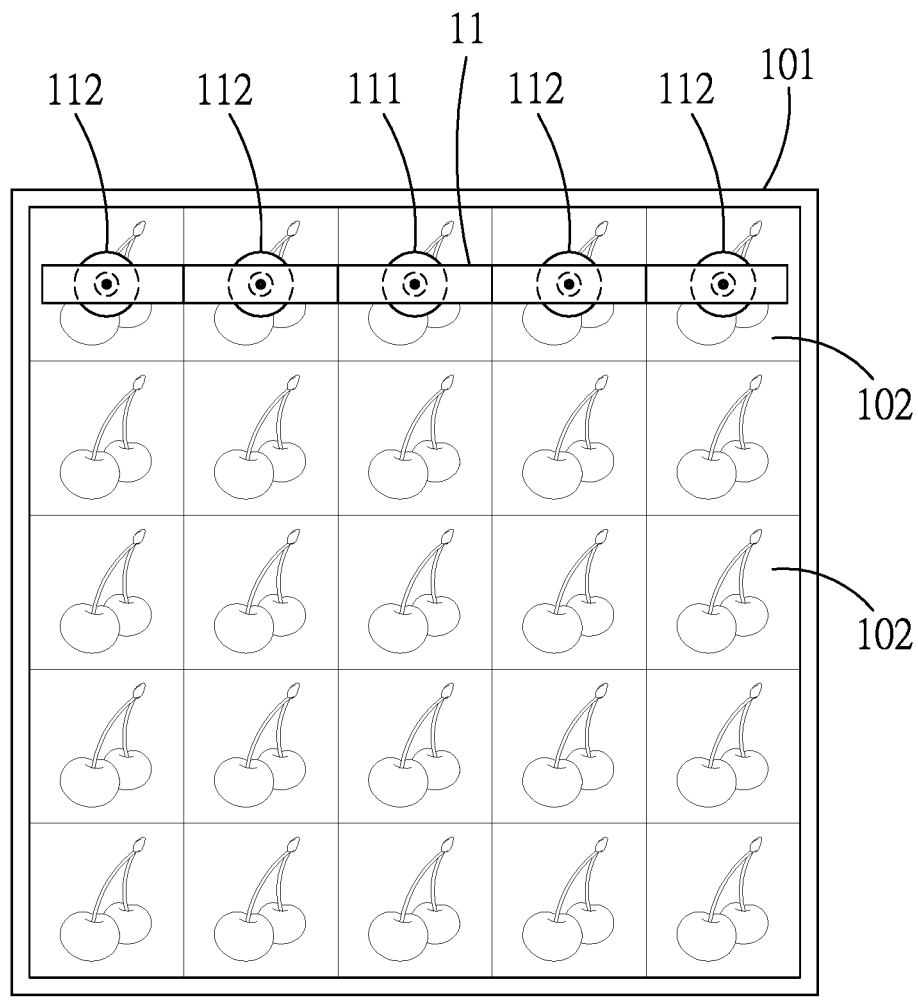
FIG. 8 is a schematic diagram exemplarily illustrating a top view of the container of FIG. 5 when a picking is operated to pick up objects from the container in a first round.

For example, in an embodiment of the disclosure where five picking devices including a fixed picking device 111 and four unfixed picking device 112 are arranged on the picking jig 11 in a straight-line pattern as illustrated in FIG. 3, if the picking instruction received by the controller 2 in Step S0 indicates "picking up eight objects, dropping three objects at a first location, dropping three objects at a second location, and dropping two objects at a third location", and if the container 101 in the picking area 100 is fully occupied and contains twenty-five rectangular objects 102 that are neatly and tightly arranged in a 5×5 array as illustrated in FIG. 5, the controller 2 may determine that M is five, and thus select five target first coordinate sets (because eight objects are to be picked up, a maximum picking number of the picking jig 11 (the maximum number of objects that can be picked up by the picking jig 11 at once) is five, and there are more than five objects 102 in the container 101) that correspond to the five objects 102 in the upmost row Step S5, determine five second coordinate sets that respectively correspond to the five target first coordinate sets in Step S6, determine a target orientation of the picking jig 11 that compiles with a direction of the row and select the middle second coordinate set that corresponds to the middle (i.e., the third) object in the upmost row as the target second coordinate set in Step S7, adjust positions of the four unfixed picking devices 112 in Step S8, control and move the robotic arm 1 such that the fixed picking device 111 is aligned with the center point of the third object in the upmost row and that the orientation of the picking jig 11 is parallel to the row in Step S0 (a top view of the picking jig 11 and the container 101 at this point is illustrated in FIG. 8), and control the robotic arm 1 to pick up the five objects of the upmost row, to drop three of the five objects at the first location, and to drop the remaining two of the five objects at the second location in Step S10 according to the picking instruction in a first round of the pick-and-drop task indicated by the picking instruction.

In Step S18, the controller 2 controls the robotic arm 1 to return to an initial position (where the fixed picking device 111 is at the default location), and determines whether the pick-and-drop task indicated by the picking instruction has been completed. If the pick-and-drop task has been completed, the procedure ends; if the pick-and-drop task is unfinished, the procedure goes back to Step S1.

Figure 9:
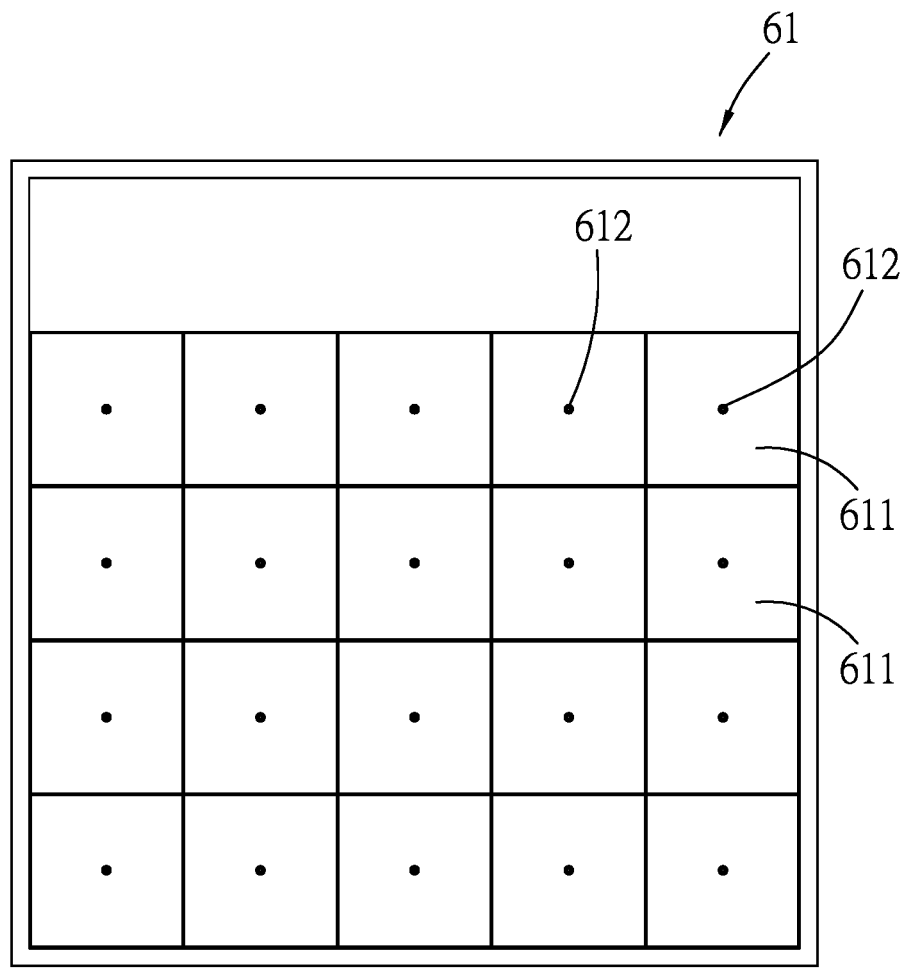
FIG. 9 is a schematic diagram exemplarily illustrating another analyzed image with center points of objects added.

Continuing with the example described in the paragraph preceding the previous paragraph, since there are three more objects to be picked up for the pertinent pick-and-drop task, the procedure goes back to Step S1 for a second round. Refer g to FIG. 9, in the second round, the analyzed image generated by the image recognition unit 32 in Step S2 includes twenty squares 611 representing the outlines of the twenty rectangular objects 102 remaining in the container 101, and twenty center points 612 respectively for the twenty rectangular objects 102 are determined by the image processing unit 33 in Step S4. In the second round, the controller 2 determines that M is three (since only three more objects are to be picked up in this round), and thus selects three target first coordinate sets that correspond to the first three objects 102 from the left in the upmost row in Step S5, determines three second coordinate sets that respectively correspond to the three target first coordinate sets in Step S6, and selects one of the three second coordinate sets as the target second coordinate set in Step S7. In this example, the target second coordinate set may be the middle second coordinate set that is among the three second coordinate sets and that corresponds to the second object from the left in the upmost row. Then, the controller 2 adjusts positions of two unfixed picking devices 112, e.g., the leftmost unfixed picking device 112 and the rightmost unfixed picking device 112, in Step S8. Next, the controller 2 may control and move the robotic arm 1 such that said two unfixed picking devices 112 and the fixed picking device 111 are respectively aligned with the center points of the first three objects from the left in the upmost row, and control the robotic arm 1 to pick up said three objects, to drop one of said three objects at the second location, and to drop the remaining two objects at the third location in Step S10 to complete the pick-and-drop task indicated by the picking instruction. Afterwards, the robotic arm 1 returns to the initial position in Step S18, and then the procedure ends.

Figure 10:
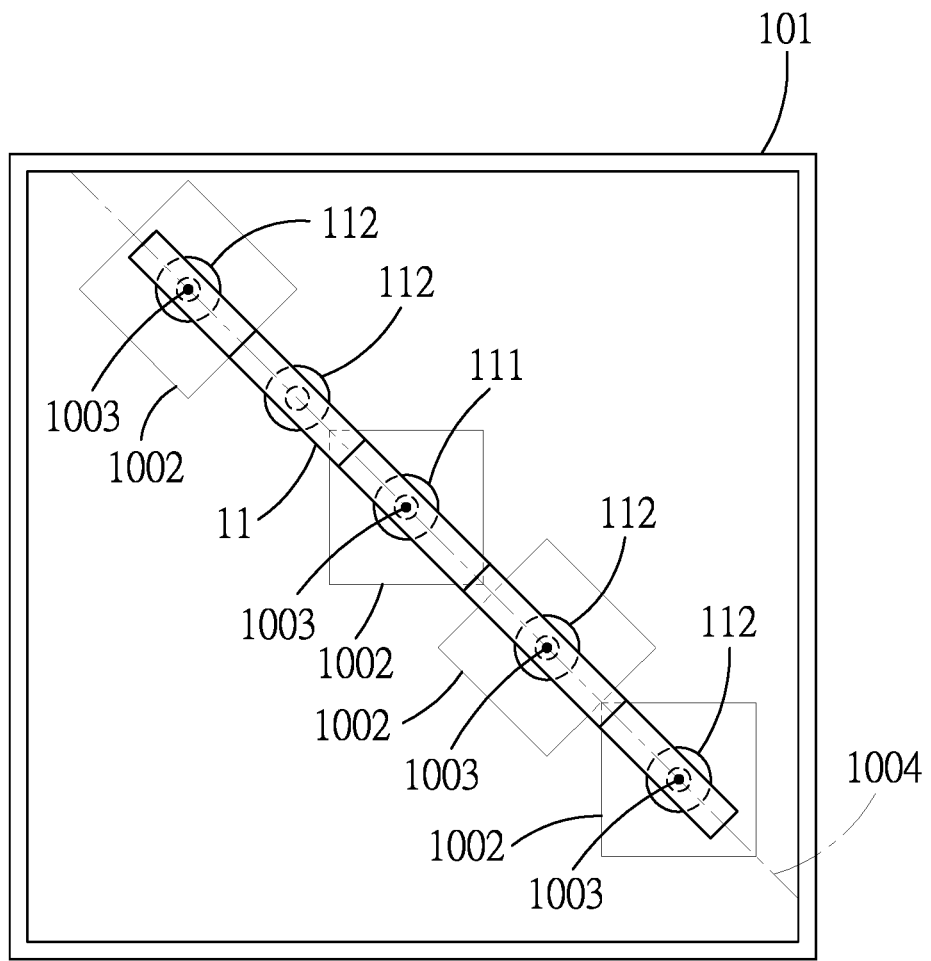
FIG. 10 is a schematic diagram exemplarily illustrating a top view of another container when a picking jig is operated to pick up objects from the container.

It should be noted that the processes of Steps S5-S10 can be a lied not only on containers containing neatly arranged objects, but also on containers containing randomly arranged objects. For example, referring to FIG. 10, in which another container 101 containing four objects 1002 that are not arranged as neatly as the objects 102 in the container 101 of FIG. 5 is illustrated, the four objects 1002 may also be picked up simultaneously with the picking devices on the picking jig 11 as used in the embodiments illustrated in FIGS. 2, 3 and 8 since the center points of these objects 1002 all fall on a same straight line 1004 and thus match the predefined pattern of arrangement of the illustrated picking devices 111, 112, and since the distance between the two end objects 1002 (the two objects 1002 that are furthest apart) does not exceed the maximum distance between the two end unfixed picking devices 112 (the two unfixed picking devices 112 that are furthest apart) when the two end unfixed picking devices 112 are moved to their farthest positions from the fixed picking device 111.

Referring back to FIG. 4, when only one object is recognized by the image recognition unit 32 in Step S2, so only one first coordinate set of the center point for the only one object determined and sent by the image processing unit 33 in Step S4, the procedure goes to Step S11. In S11, the controller 2 determines only one second coordinate set based on the one first coordinate set received from the image recognition device 3, wherein the one second coordinate set represents a relative position of the center point of the one object to the fixed picking device 111.

In Step S12, the controller 2 determines whether the one object is within an operation area of the fixed picking device 111 based on the one second coordinate set. If the one object is within the operation area, the procedure goes to Step S13; otherwise, the procedure goes to Step S15. According to some embodiments of the disclosure, the operation area is determined based at least on a minimum distance between the fixed picking device 111 and one of the N number of unfixed picking devices 112 that is arranged nearest an end of the picking jig 11 (which is the distance therebetween when the one unfixed picking device 112 is moved to its nearest position to the fixed picking device 111), such that objects in the operation area can be picked up by the fixed picking device 111 without the picking jig 11 colliding with a frame of the container 101. In an embodiment, the analyzed image generated by the image recognition unit 32 of the image recognition device 3 also contains information of location of the frame of the container 101, and determination of the operation area is further based on said information.

In Step S13, the controller 2 controls the robotic arm 1 to move the picking 11 based on the one second coordinate set, such that the fixed picking device 111 is aligned with the center point of the one object.

In Step S14, the controller 2 controls the robotic arm 1 to pick up the one object with the fixed picking device 111, and then drop the one object at a designated location indicated in the picking instruction. Then, the procedure goes to Step S18, which has been described above.

On the other hand, in Step S15 which is performed when the one object is not within the operation area, the controller 2 selects, from among the N number of unfixed picking devices 112, one unfixed picking device 112 that is nearest to the one object based on the one second coordinate set and relative positions of the N number of unfixed picking devices 112 to the fixed picking device 111.

In Step S16, the controller 2 controls the robotic arm 1 to move the picking jig 11 based on the one second coordinate set and a relative position of the one unfixed picking device 112 to the fixed picking device 111, such that the one unfixed picking device 112 is aligned with the center point of the one object.

In Step S17, the controller 2 controls the robotic arm 1 to pick up the one object with the one unfixed picking device 111, and then drop the one object at a designated location indicated in the picking instruction. Then, the procedure also goes to above-mentioned Step S18.

In summary, based on the aforementioned method for detecting and picking up objects of this disclosure, the robotic arm 1 is able to simultaneously pick up multiple objects, thereby promoting efficiency of object retrieval and movement.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiment (s) but is intended to cover various arrangements included within the spirit and scope of the broadest interpretation so as to encompass all such modifications and equivalent arrangements.

What is claimed is:

1. A method for detecting and picking up objects that is to be performed by a system including a robotic arm, a controller and an image recognition device, the robotic arm including N+1 number of picking devices that are arranged in a predefined pattern and on a picking jig, and that include a fixed picking device and N number of unfixed picking devices, a distance between each of the unfixed picking devices and the fixed picking device being adjustable, N being a positive integer, the method comprising steps of:

by the image recognition device,
capturing an image of a container,
recognizing one or more objects in the container based on the image thus captured by means of an image recognition technique,
determining one or more center points respectively for the one or more objects thus recognized,
determining one or more first coordinate sets respectively of the one or more center points, each of the one or more first coordinate sets representing a relative position of the respective one of the one or more center points to the image recognition device, and
sending the one or more first coordinate sets to the controller; and by the controller when the one or more objects recognized in the container includes multiple objects and when the respective one or more first coordinate sets for the one or more objects determined and sent by the image recognition device includes multiple first coordinate sets respectively of multiple center points which are determined respectively for the multiple objects,
selecting M number of target first coordinate sets from among the multiple first coordinate sets, M being a positive integer that ranges from two to N+1, the M number of target first coordinate sets respectively corresponding to M number of objects among the multiple objects, arrangement of the M number of objects matching the predefined pattern, and a largest distance between any two of the M number of objects not exceeding a predetermined distance,
determining M number of second coordinate sets based respectively on the M number of target first coordinate sets, the M number of second coordinate sets each representing a relative position of the center point of one of the objects that corresponds to the respective one of the target first coordinate sets to the fixed picking device,
determining a target orientation of the picking jig based on the M number of second coordinate sets,
selecting one of the M number of second coordinate sets as a target second coordinate set,
adjusting positions of M−1 number of unfixed picking devices which are among the N number of unfixed picking devices based on the target second coordinate set and M−1 number of second coordinate sets which are the M number of second coordinate sets other than the target second coordinate set, in order to adjust distances each between a respective one of the M−1 number of unfixed picking devices and the fixed picking device,
controlling the robotic arm to horizontally rotate the picking jig based on the target orientation, and move the picking jig based on the target second coordinate set, such that the fixed picking device is aligned with the center point of one of the objects that corresponds to the target second coordinate set, and that the M−1 number of unfixed picking device are aligned respectively with M−1 center points respectively of M−1 number of objects that respectively correspond to the M−1 number of second coordinate sets, and
controlling the robotic arm to simultaneously pick up the M number of objects with the M−1 number of unfixed picking devices and the fixed picking device.

2. The method of claim 1, further comprising the following steps performed by the controller when the one or more objects recognized in the container includes only one object and when the one or more first coordinate sets determined and sent by the image recognition device includes only one first coordinate set of a center point which is determined for the one object:

determining only one second coordinate set based on the one first coordinate set, the one second coordinate set representing a relative position of the center point of the one object to the fixed picking device;

determining whether the one object is within an operation area of the fixed picking device based on the one second coordinate set;

when it is determined that the one object is within the operation area of the fixed picking device, controlling the robotic arm to move the picking jig based on the one second coordinate set, such that the fixed picking device is aligned with the center point of the one object, and controlling, the robotic arm to pick up the one object with the fixed picking device; and when it is determined that the one object is not within the operation area of the fixed picking device, selecting, from among the N number of unfixed picking devices, one unfixed picking device that is nearest to the one object based on the one second coordinate set and relative positions of the N number of unfixed picking devices to the fixed picking device, controlling the robotic arm to move the picking jig based on the one second coordinate set and a relative position of the one unfixed picking device to the fixed picking device, such that the one unfixed picking device is aligned with the center point of the one object, and controlling the robotic arm to pick up the one object with the one unfixed picking device.

3. The method of claim 1, wherein:

the step of capturing an image is to capture a three-dimensional color image; and the step of recognizing the one or more objects is to recognize the one or more objects through an artificial neural network (ANN) that is executed in the image recognition device and that has been trained in advance, the ANN recognizing existence of the one or more objects and a quantity of the one or more objects when the image is inputted to the ANN.

4. The method of claim 1, wherein the step of controlling the robotic arm to pick up the M number of objects includes:

controlling the robotic arm to simultaneously pick up the M number of objects with the M−1 number of unfixed picking devices and the fixed picking device, each of the M−1 number of unfixed picking devices and the fixed picking device being one of a sucking disk and a gripper.

5. The method of claim 1; the system including a host computer, the method further comprising the following step before the step of capturing an image of a container:

by the controller, receiving a picking instruction from the host computer;

wherein the step of selecting M number of target first coordinate includes determining the value of M based at least on the picking instruction.

6. The method of claim 1, the predefined pattern being a straight line, wherein the step of selecting M number of target first coordinate sets is to select M number of target first coordinate sets including one first coordinate set that corresponds to an object which is among the multiple objects and which is located closest to a corner of the container, and M−1 number of target first coordinate sets that are nearest to the one first coordinate set in a straight line passing through the one first coordinate set.

7. A system for detecting and picking up objects, the system comprising:

a robotic arm including a picking jig disposed at an end portion of said robotic arm, and N+1 number of picking devices disposed on said picking jig, said picking devices being arranged in a predefined pattern and including a fixed picking device and N number of unfixed picking devices, a distance between each of said unfixed picking devices and said fixed picking device being adjustable; N being a positive integer;

a controller electrically connected to said robotic arm; and an image recognition device in communication with said controller; said image recognition device being configured to;

capture an image of a container, recognize one or more objects in the container based on the image by means of an image recognition technique, determine one or more center points respectively for the at one or more objects, determine one or more first coordinate sets respectively of the one or more center points, each of the one or more first coordinate sets representing a relative position of the respective one of the one or more center points to said image recognition device, and send the one or more first coordinate sets to said controller; and wherein said controller is configured to, when the one or more objects recognized in the container includes multiple objects and when the respective one or more first coordinate sets for the one or more objects determined and sent by said image recognition device includes multiple first coordinate sets respectively of multiple center points which are determined respectively for the multiple objects, select M number of target first coordinate sets from the multiple first coordinate sets received from said image recognition device, M being a positive integer that ranges from two to N+1, the M number of target first coordinate sets respectively corresponding to M number of objects among the multiple objects, arrangement of the M number of objects matching the predefined pattern, and a largest distance between any two of the M number of objects not exceeding a predetermined distance, determine M number of second coordinate sets based respectively on the M number of target first coordinate sets, the M number of second coordinate sets each representing a relative position of the center point of one of the objects that corresponds to the respective one of the target first coordinate sets to said fixed picking device, determine a target orientation of said picking jig based on the M number of second coordinate sets, select one of the M number of second coordinate sets as a target second coordinate set, adjust positions of M−1 number of unfixed picking devices which are among said N number of unfixed picking devices based on the target second coordinate set and M−1 number of second coordinate sets which are the M number of second coordinate sets other than the target second coordinate set, in order to adjust distances each between a respective one of said M−1 number of unfixed picking devices and said fixed picking device, control said robotic arm to horizontally rotate said picking jig based on the target orientation, and move said picking jig based on the target second coordinate set, such that said fixed picking device is aligned with the center point of one of the objects that corresponds to the target second coordinate set, and that said M−1 number of unfixed picking device are aligned respectively with M−1 center points respectively of M−1 number of objects that respectively correspond to the M−1 number of second coordinate sets, and control said robotic arm to simultaneously pick up the M number of objects with said M−1 number of unfixed picking devices and said fixed picking device.

8. The system of claim 7, wherein said controller is further configured to, when the one or more objects recognized in the container includes only one object and when the one or more first coordinate sets determined and sent by, said image recognition device includes only one first coordinate set of a center point which is determined for the one object:

determine only one second coordinate set based on the one first coordinate set received from said image recognition device, the one second coordinate set representing a relative position of the center point of the one object to said fixed picking device;

determine whether the one object is within an operation area of said fixed picking device based on the one second coordinate set;

when it is determined that the one object is within the operation area of said fixed picking device,
control said robotic arm to move said picking jig based on the one second coordinate set, such that said fixed picking device is aligned with the center point of the one object, and
control said robotic arm to pick up the one object with said fixed picking device; and when it is determined that the one object is not within the operation area of said fixed picking device,
from among said N number of unfixed picking devices, select one unfixed picking device that is nearest to the one object based on the one second coordinate set and relative positions of said N number of unfixed picking devices to said fixed picking device,
control said robotic arm to move said picking jig based on the one second coordinate set and a relative position of said one unfixed picking device to said fixed picking device, such that said one unfixed picking device is aligned with the center point of the one object, and
control said robotic arm to pick up the one object with said one unfixed picking device.

9. The system of claim 7, wherein:
the image captured by said image recognition device is a three-dimensional color image; and
said image recognition device is installed with an artificial neural network (ANN) that has been trained in advance, the ANN recognizing existence of the one or more objects and a quantity of the one or more objects when the image is inputted to the ANN executed by said image recognition device.

10. The system of claim 7, wherein each of said M−1 number of unfixed picking devices and said fixed picking device is one of a sucking disk and a gripper.

11. The system of claim 7, further comprising:
a host computer electrically connected to said controller, said host computer being configured to send a picking instruction to said controller;
wherein said controller is further configured to determine the value of M based at least on the picking instruction received from said host computer.

12. The system of claim 7, wherein:
the predefined pattern is a straight line; and
the M number of target first coordinate sets include one first coordinate set that corresponds to an object that is among the multiple objects and that is located closest to a corner of the container, and M−1 number of target first coordinate sets that are nearest to the one first coordinate set in a straight line passing through the one first coordinate set.

* * * * *